United States Patent
Yoo et al.

(10) Patent No.: US 11,214,497 B2
(45) Date of Patent: Jan. 4, 2022

(54) PEROVSKITE COMPOUND, METHOD FOR PRODUCING THE PEROVSKITE COMPOUND, CATALYST FOR FUEL CELL INCLUDING THE PEROVSKITE COMPOUND AND METHOD FOR PRODUCING THE CATALYST

(71) Applicants: KOREA INSTITUTE OF SCIENCE AND TECHNOLOGY, Seoul (KR); INDUSTRIAL COOPERATION FOUNDATION CHONBUK NATIONAL UNIVERSITY, Jeonju-si (KR); GLOBAL FRONTIER CENTER FOR MULTISCALE ENERGY SYSTEMS, Seoul (KR)

(72) Inventors: Sung Jong Yoo, Seoul (KR); Sehyun Lee, Seoul (KR); Hee-Young Park, Seoul (KR); So Young Lee, Seoul (KR); Hyun Seo Park, Seoul (KR); Jin Young Kim, Seoul (KR); Jong Hyun Jang, Seoul (KR); Hyoung-Juhn Kim, Seoul (KR); Pil Kim, Jeonju-si (KR); Jae Young Jung, Sejong-si (KR); Yeonsun Sohn, Jeonju-si (KR)

(73) Assignees: Korea Institute of Science and Technology, Seoul (KR), PART INTEREST; Industrial Cooperation Foundation Chonbuk National University, Jeonju-si (KR), PART INTEREST; Global Frontier Center for Multiscale Energy Systems, Seoul (KR), PART INTEREST ( * ) Notice: Subject to any disclaimer, the term of this patent is extended or adjusted under 35 U.S.C. 154(b) by 281 days.

(21) Appl. No.: 16/534,294

(22) Filed: Aug. 7, 2019

(65) Prior Publication Data
US 2020/0283307 A1  Sep. 10, 2020

(30) Foreign Application Priority Data
Mar. 6, 2019 (KR) .......................... 10-2019-0025889

(51) Int. Cl.
*C01G 55/00* (2006.01)
*B01J 23/00* (2006.01)
*B01J 23/44* (2006.01)

(52) U.S. Cl.
CPC ............ *C01G 55/002* (2013.01); *B01J 23/44* (2013.01); *C01P 2002/01* (2013.01); *C01P 2002/34* (2013.01); *C01P 2002/72* (2013.01)

(58) Field of Classification Search
CPC .............................. C01G 55/002; B01J 23/44
See application file for complete search history.

(56) References Cited

U.S. PATENT DOCUMENTS 8,974,657 B2 * 3/2015 Swartz ................. G01N 27/403
                                                                205/783.5

OTHER PUBLICATIONS

Dimitri D. Vaughn II et al., "Solution Synthesis of Cu3 PdN Nanocrystals as Ternary Metal Nitride Electrocatalysts for the Oxygen Reduction Reaction", Publication Date: Oct. 8, 2014, pp. 6226-6232.
Kurian A. Kuttiyiel et al., "Nitride Stabilized PtNi Core—Shell Nanocatalyst for high Oxygen Reduction Activity", Nano Letters, 2012, pp. 6266-6271, vol. 12.
Jue Hu et al., "Pt Monolayer Shell on Nitrided Alloy Core—A Path to Highly Stable Oxygen Reduction Catalyst", Catalysts, 2015, pp. 1321-1332, vol. 5.
Jae Young Jung, "Synthesis and characterization of carbon-supported PtNi hollow and Pd—PdNiN shell-core nanoparticles for oxygen reduction reaction", Department of Semiconductor and Chemical Engineering, Chonbuk National University, Feb. 22, 2018.

* cited by examiner

*Primary Examiner* — Sikarl A Witherspoon
(74) *Attorney, Agent, or Firm* — Rabin & Berdo, P.C.

(57) ABSTRACT

Disclosed are a perovskite compound, a method for producing the perovskite compound, a catalyst for a fuel cell including the perovskite compound, and a method for producing the catalyst. The perovskite compound overcomes the low stability of palladium due to its perovskite structural properties. Therefore, the perovskite compound can be used as a catalyst material for a fuel cell. In addition, the use of palladium in the catalyst instead of expensive platinum leads to an improvement in the price competitiveness of fuel cells. The catalyst is highly durable and catalytically active due to its perovskite structure.

2 Claims, 4 Drawing Sheets

Example 1

Example 2

- Pd or ● Ni (a site)
- ● Nitrogen (b site)
- ● Ni (c site)

PEROVSKITE COMPOUND, METHOD FOR PRODUCING THE PEROVSKITE COMPOUND, CATALYST FOR FUEL CELL INCLUDING THE PEROVSKITE COMPOUND AND METHOD FOR PRODUCING THE CATALYST

CROSS-REFERENCE TO RELATED APPLICATIONS

This application claims priority under 35 U.S.C. § 119 to Korean Patent Application No. 10-2019-0025889 filed on Mar. 6, 2019 in the Korean Intellectual Property Office, the disclosure of which is incorporated herein by reference in its entirety.

BACKGROUND OF THE INVENTION

1. Field of the Invention

The present invention relates to a perovskite compound, a method for producing the perovskite compound, a catalyst for a fuel cell including the perovskite compound, and a method for producing the catalyst.

2. Description of the Related Art

With an increasing demand for clean renewable energy sources, considerable research efforts have concentrated on fuel cells that use hydrogen as an energy source to generate only water as a byproduct. Platinum catalysts are considered the most effective catalysts for fuel cells. Fuel cells using platinum catalysts have recently entered commercialization. However, the limited reserves and high price of platinum are considered obstacles to the expansion of the market for fuel cells. In attempts to solve the problems of platinum-based fuel cells, researchers have searched for materials as potential replacements for platinum and applied the searched materials to fuel cells.

Palladium belongs to the same group as platinum and has an electronic structure similar to that of platinum. Thus, palladium has received a lot of attention as a substitute for platinum. However, the inherent low stability of palladium is difficult to overcome despite its high catalytic activity. Studies have been conducted to overcome the inherent low stability of palladium by doping or coating the surface of palladium catalysts with highly reducing and chemically stable metals to protect the palladium catalysts. However, since these approaches are not intended to enhance the inherent structural stability of palladium, they have limitations in inhibiting the structural collapse of palladium during long-term operation.

PRIOR ART DOCUMENTS

Non-Patent Documents

1. Kurian A. Kuttiyiel; Kotaro Sasaki; YongMan Choi; Dong Su; Ping Liu; and Radoslav R. Adzic, Nano Lett., 2012, 12, 6266
2. Jue Hu; Kurian A. Kuttiyiel; Kotaro Sasaki; Dong Su; Tae-Hyun Yang; Gu-Gon Park; Chengxu Zhang; Guangyu Chen; and Radoslav R. Adzic, Catalysts., 2015, 5, 1321

SUMMARY OF THE INVENTION

The present invention has been made in view of the above problems, and it is an object of the present invention to provide a perovskite compound including palladium and a catalyst for a fuel cell including the perovskite compound.

It is a further object of the present invention to provide a method for producing the perovskite compound and a method for producing the catalyst.

One aspect of the present invention provides a perovskite compound represented by Formula 1:

$$[A_n Pd_{(1-n)}][B][X]_3 \qquad (1)$$

wherein A is a metal other than palladium, B is selected from nitrogen, phosphorus, sulfuric acid, boron, carbon, and oxygen, X is identical to or different from A and is a metal other than palladium, and n is a real number satisfying $0 \leq n < 1$.

A further aspect of the present invention also provides a method for producing a perovskite compound, including (A) mixing a first mixed solution including a carbon support and a reducing agent with a second mixed solution including a palladium precursor and a first metal precursor to prepare palladium-first metal alloy particles and (B) annealing the palladium-first metal alloy particles in an ammonia gas atmosphere.

Another aspect of the present invention provides a palladium-based catalyst for a fuel cell including a core and a palladium shell surrounding the surface of the core wherein the core includes the perovskite compound.

Yet another aspect of the present invention also provides a method for producing a palladium-based catalyst for a fuel cell, including (A') mixing a first mixed solution including a carbon support and a reducing agent with a second mixed solution including a palladium precursor and a first metal precursor to prepare palladium-first metal alloy particles, (B') annealing the palladium-first metal alloy particles in an ammonia gas atmosphere to obtain a core composed of palladium-first metal-nitrogen alloy particles having a perovskite structure, and (C') galvanically displacing the first metal located on the surface of the core with palladium to form a palladium shell.

The perovskite compound of the present invention overcomes the low stability of palladium due to its perovskite structural properties. Therefore, the perovskite compound of the present invention can be used as a catalyst material for a fuel cell. In addition, the use of palladium in the catalyst of the present invention instead of expensive platinum leads to an improvement in the price competitiveness of fuel cells. The catalyst of the present invention is highly durable and catalytically active due to its perovskite structure.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
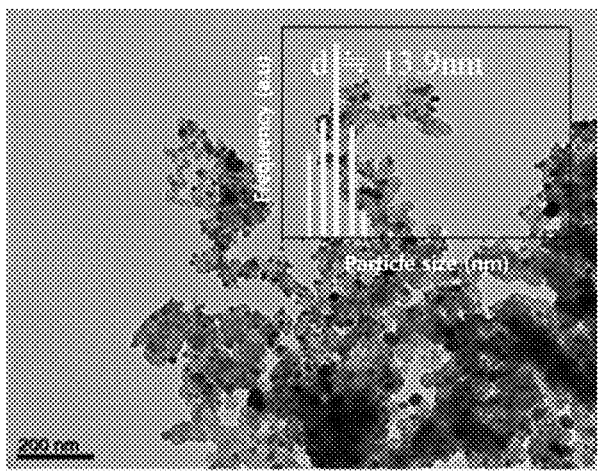
FIG. 1 shows transmission electron microscopy images of a perovskite compound produced in Example 1 and a catalyst produced in Example 2.
Figure 1:
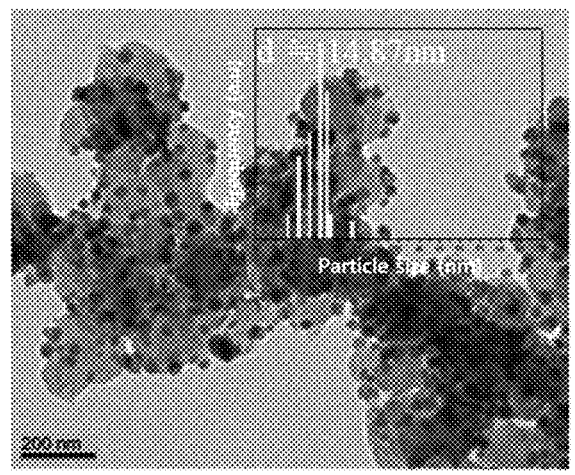

Several aspects and various embodiments of the present invention will now be described in more detail.

Palladium belonging to the same group as platinum has an electronic structure similar to that of platinum and has the second highest activity for redox reactions but platinum. For these reasons, palladium has received a lot of attention as a substitute for platinum. However, general methods for controlling the structure of platinum-based alloy catalysts cannot be applied to palladium that is chemically weaker than platinum. Another problem of palladium is its inherent low stability. Studies have been conducted to overcome the inherent low stability of palladium by doping or coating the surface of palladium catalysts with highly reducing and chemically stable metals to protect the palladium catalysts. However, since these approaches are not intended to enhance the inherent structural stability of palladium, they have limitations in inhibiting the structural collapse of palladium during long-term operation.

The present inventors have succeeded in synthesizing a palladium-containing compound having a perovskite structure and have found that the perovskite structure makes the palladium-containing compound structurally strong and can provide a solution to the problem of the inherent low stability of palladium.

The term "perovskite compound" refers collectively to materials having a 3-dimensional crystal structure in relation with the crystal structure of $CaTiO_3$. Perovskite compounds are used in various types of electronic devices, including solar cells. However, the perovskite compound of the present invention is of significance in that non-oxide perovskite compounds applicable to catalysts for fuel cells have never been reported to date.

One aspect of the present invention provides a perovskite compound represented by Formula 1:

$$[A_nPd_{(1-n)}][B][X]_3 \qquad (1)$$

wherein A is a metal other than palladium, B is selected from nitrogen, phosphorus, sulfuric acid, boron, carbon, and oxygen, X is identical to or different from A and is a metal other than palladium, and n is a real number satisfying 0≤n<1.

According to one embodiment, each of A and X in Formula 1 may be independently selected from nickel, cobalt, copper, iron, vanadium, chromium, manganese, and zinc.

According to a further embodiment, n in Formula 1 is preferably a real number satisfying the relationship 0.1≤n≤0.5, more preferably 0.3≤n≤0.4, but is not limited to this relationship.

A further aspect of the present invention provides a method for producing a perovskite compound, including (A) mixing a first mixed solution including a carbon support and a reducing agent with a second mixed solution including a palladium precursor and a first metal precursor to prepare palladium-first metal alloy particles and (B) annealing the palladium-first metal alloy particles in an ammonia gas atmosphere.

According to one embodiment, the first metal may be selected from nickel, cobalt, copper, iron, vanadium, chromium, manganese, and zinc.

According to a further embodiment, in step (A), a first mixed solution including a carbon support and a reducing agent is prepared, a second mixed solution including a palladium precursor and a first metal precursor is prepared, and the first mixed solution is mixed with the second mixed solution to prepare palladium-first metal alloy particles.

More specifically, a carbon support is dispersed in anhydrous ethanol, the dispersion is heated to 50 to 90° C., and a reducing agent is added to the dispersion under heating to prepare a first mixed solution; a palladium precursor and a first metal precursor are mixed in anhydrous ethanol to prepare a second mixed solution; the second mixed solution is added at a rate of 1 to 10 ml/min to the first mixed solution under heating to reduce the precursors; and the resulting solution is filtered and washed to obtain palladium-first metal alloy particles.

According to another embodiment, the carbon-based support may be treated with an acid before use but is not limited to this treatment. The acid treatment is preferred because it causes the formation of defects into which the perovskite compound can be loaded. That is, the acid treatment increases the amount of the perovskite compound loaded into the carbon-based support. Specifically, the carbon-based support is treated with a mixed solution of nitric acid and sulfuric acid at 80 to 100° C. for 2 to 5 hours.

According to another embodiment, the palladium precursor may be selected from palladium acetylacetonate (Pd(acac)$_2$), palladium(II) chloride (PdCl$_2$), palladium(II) acetate (Pd(OCOCH$_3$)$_2$), palladium(II) nitrate (Pd(NO$_3$)$_2$), and palladium sulfide (PdS).

Palladium acetylacetonate is particularly preferred because its bulky ligands are good leaving groups upon formation of metal alloy particles and it is highly soluble in alcohol as a major solvent.

According to another embodiment, the first metal precursor may be selected from a first metal acetylacetonate, a first metal chloride, a first metal acetate, a first metal nitrate, and a first metal sulfide.

For example, when the first metal is nickel, the first metal precursor may be selected from nickel acetylacetonate (Ni(acac)$_2$), nickel(II) chloride (NiCl$_2$), nickel chloride(II) hydrate (NiCl$_2$·xH$_2$O), nickel(II) nitrate (Ni(NO$_3$)$_2$), and nickel sulfate (NiSO$_4$).

According to another embodiment, the palladium precursor and the first metal precursor may include the same type of ligand and may be mixed in amounts such that the palladium and the first metal are present in an atomic ratio of 1:1-5 in the second mixed solution. The atomic ratio between the palladium and the first metal in the second mixed solution is preferably 1:2-4, more preferably 1:3-4.

It was found that when the palladium precursor and the first metal precursor having the same type of ligand are used and the atomic ratio between the palladium and the first metal in the second mixed solution is within the range defined above, a perovskite structure is formed. In contrast, it was found that when the ligand of the palladium precursor is different from that of the first metal precursor or the atomic ratio between the palladium and the first metal in the second mixed solution is outside the range defined above, no perovskite structure is formed.

According to another embodiment, the reducing agent may be selected from NaBH$_4$, Na(BH$_3$CN), LiBH$_4$, N$_2$H$_4$, AlBH$_4$, and LiAlH$_4$.

According to another embodiment, in step (B), the annealing may be performed by increasing the temperature at a rate of 1 to 10° C./min from room temperature to 400 to 900° C. and maintaining the final temperature for 1 to 4 hours. Preferably, the annealing is performed by increasing the temperature at a rate of 2 to 8° C./min to 500 to 800° C. and maintaining the final temperature for 1 to 3 hours. More preferably, the annealing is performed by increasing the temperature at a rate of 4 to 6° C./min to 550 to 650° C. and maintaining the final temperature for 90 to 150 minutes.

The perovskite structure can be achieved by the nitrogen of ammonia. According to one embodiment of the present invention, the nitrogen occupies the B-site of the perovskite structure, which is usually represented by $[A]^{1a}[B]^{1b}[X_3]^{3c}$.

Another aspect of the present invention provides a palladium-based catalyst for a fuel cell including a core and a palladium shell surrounding the surface of the core wherein the core includes the perovskite compound.

The first metal is a relatively cheap non-precious metal and the compositions of the non-precious metal and the alloy catalyst are controlled such that a perovskite lattice structure is achieved.

The presence of the first metal in the perovskite lattice minimizes the reduction in the performance of the catalyst caused by dissolution of the first metal, leading to the stabilization of the alloy core. In addition, the palladium shell is formed by displacement with the non-precious metal present on the core surface. This displacement further inhibits the dissolution of the first metal from the core to further improve the stability of the palladium.

According to another embodiment, the carbon-based support of the core may be selected from carbon black, ketjen black, carbon nanotubes, carbon nanofibers, graphite carbon, graphene, graphene oxide, and mixtures thereof but is not limited thereto.

The perovskite compound is loaded into the carbon-based support, with the result that the dispersibility of the particles is improved and the surface area of the catalyst increases, resulting in improved reactivity of the catalyst.

According to another embodiment, the palladium shell may be doped with at least one metal selected from iridium, platinum, and ruthenium. The doping metal can improve the stability of the palladium due to its high reduction potential compared to the first metal Like the palladium, the doping metal may be galvanically displaced with the first metal.

Yet another aspect of the present invention provides a method for producing a palladium-based catalyst for a fuel cell, including (A') mixing a first mixed solution including a carbon support and a reducing agent with a second mixed solution including a palladium precursor and a first metal precursor to prepare palladium-first metal alloy particles, (B') annealing the palladium-first metal alloy particles in an ammonia gas atmosphere to obtain a core composed of palladium-first metal-nitrogen alloy particles having a perovskite structure, and (C') galvanically displacing the first metal located on the surface of the core with palladium to form a palladium shell.

Steps (A') and (B') can be carried out in the same manner as steps (A) and (B) in the method for producing a perovskite compound, respectively.

As described above, the first metal is a relatively cheap non-precious metal. The presence of a large amount of the non-precious metal on the surface of the core may deteriorate the activity of the alloy catalyst. Thus, the non-precious metal present on the surface of the core needs to be removed. A typical process for removal of a non-precious metal from a catalyst is dealloying by acid treatment of the catalyst. However, dealloying is not readily applicable to the palladium alloy catalyst susceptible to acid.

Thus, the first metal distributed on the surface of the core is galvanically displaced with palladium to form a palladium shell. The galvanic displacement enables removal of the first metal located on the surface of the core without loss of the palladium while ensuring the stability of the palladium.

According to one embodiment, in step (C'), the core may be allowed to react with a palladium precursor solution without contact with air or impurities to form a palladium shell.

In step (C'), the palladium precursor solution may be a solution of any of the palladium precursors mentioned in step (A'). For example, the palladium precursor solution may be a solution of $Pd(NO_3)_2$ in distilled water.

The following examples are provided to assist in further understanding of the present invention. However, these examples are provided for illustrative purposes only and the scope of the present invention is not limited thereto. It will be evident to those skilled in the art that various modifications and changes can be made without departing from the scope and spirit of the present invention.

Example 1: Synthesis of Perovskite Compound 2 g of a carbon support was treated with a mixed solution of 6 M nitric acid and 6 M sulfuric acid at 90° C. for 3 h. The acid-treated carbon support was cooled to room temperature, washed with distilled water, dried in an oven at 80° C. for 12 h, and dispersed in anhydrous ethanol by sonication for 30 min. The dispersion was heated to 70° C. and mixed with $NaBH_4$ as a reducing agent under heating.

0.08060 g of $Pd(acac)_2$ as a palladium precursor and 0.2175 g of $Ni(acac)_2$ as a nickel precursor were completely dissolved in anhydrous ethanol to prepare a precursor solution.

The precursor solution was dropped into the mixture of the carbon support and the reducing agent to reduce the precursors. The reaction was allowed to proceed for 1 h. The reaction mixture was filtered and washed with distilled water to yield PdNi/C.

The PdNi/C was annealed at a rate of 5° C./min to 600° C. in an annealing furnace under $NH_3$ atmosphere for 2 h to synthesize a perovskite compound.

Example 2: Synthesis of Palladium-Based Catalyst for Fuel Cell

After completion of the annealing, the perovskite compound was cooled to room temperature and a solution of 7 mg of $Pd(NO_3)_2$ in 100 ml of distilled water was dropped into the perovskite compound with stirring in an atmosphere protected from air or impurities. Thereafter, the mixture was allowed to react for 1 h. The reaction mixture was filtered, washed with distilled water, and dried in an oven to synthesize a palladium-nickel-nitrogen alloy catalyst with a palladium shell (PdNiN@Pd/C).

Comparative Example 1: Commercial Catalyst

A commercially available palladium-loaded carbon support (Pd/C) was used as a catalyst.

Test Example: Transmission Electron Microscopy

The particle distributions and sizes of the perovskite compound produced in Example 1 and the catalyst produced in Example 2 were analyzed by transmission electron microscopy (TEM). FIG. 1 shows transmission electron microscopy images of the perovskite compound and the catalyst. As can be seen from FIG. 1, the perovskite compound and the catalyst were uniformly distributed on the carbon support. The perovskite compound was found to have an average particle size of 13.9 nm. The catalyst was found to have an average particle size of 14.87 nm. The larger size of the catalyst is explained by the presence of the palladium shell.

Test Example 2: High Resolution Powder XRD Analysis

Figure 2:
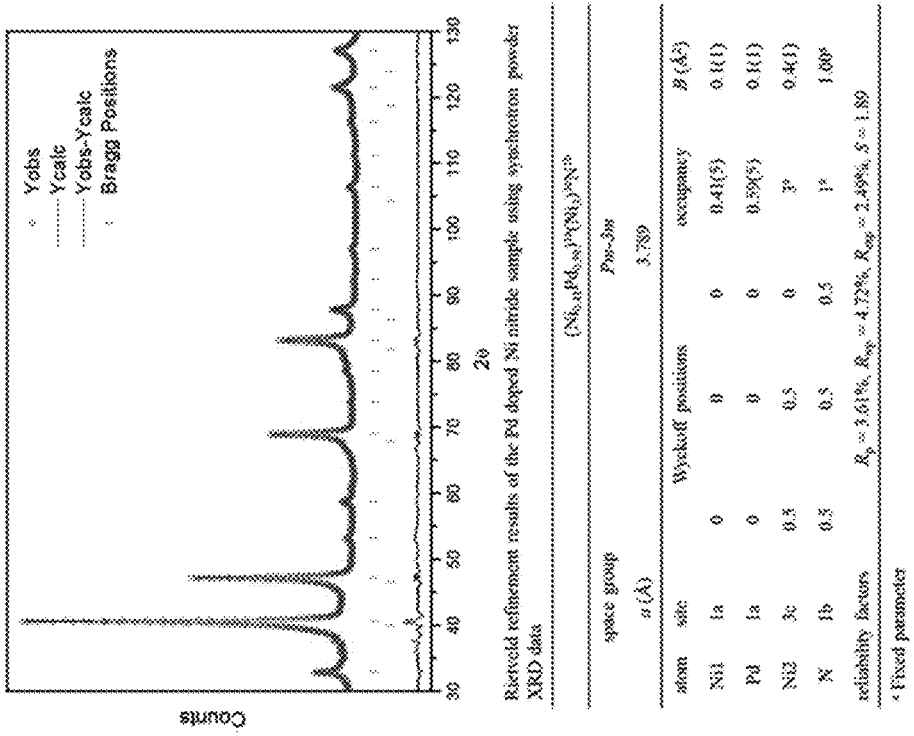
FIG. 2 shows the results of X-ray diffraction analysis for a perovskite compound produced in Example 1 and a catalyst produced in Example 2.
Figure 2:
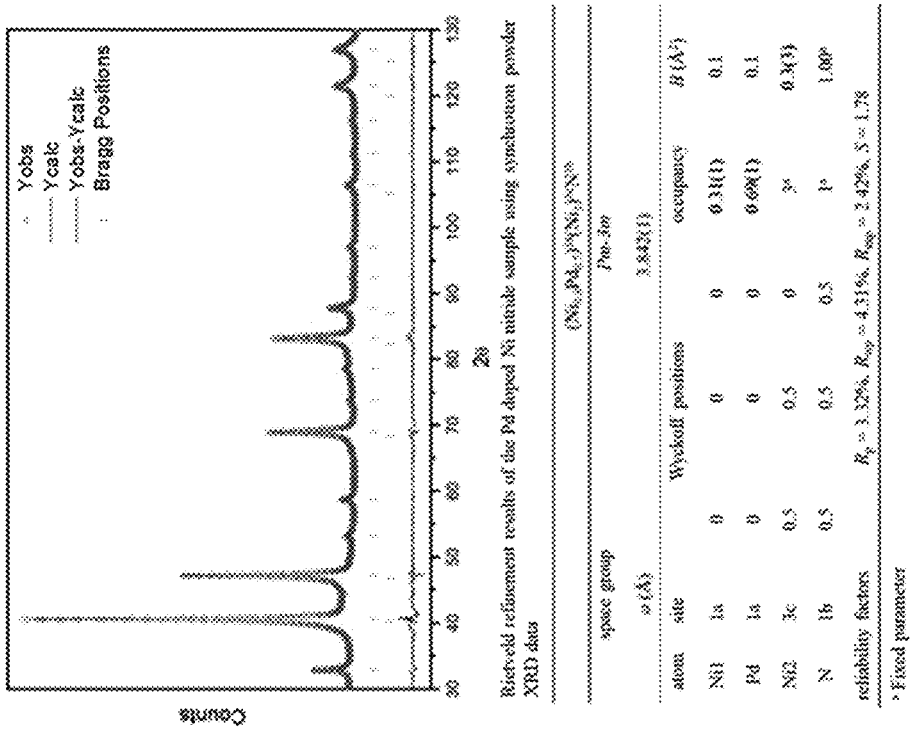

The structure of the catalyst was analyzed by high resolution powder XRD. The results are shown in FIG. 2. FIG. 2 shows the results of X-ray diffraction analysis for the perovskite compound and the catalyst. Rietveld refinement revealed that the nickel-nitride structure was doped with palladium, and the perovskite compound and the catalyst had the $ABX_3$ perovskite structures represented by $(Ni_{0.3}Pd_{0.7})^{1a}N^{1b}(Ni_3)^{3c}$ and $(Ni_{0.41}Pd_{0.59})^{1a}N^{1b}(Ni_3)^{3c}$, respectively.

Test Example 3: High Magnification Transmission Electron Microscopy

Figure 3:
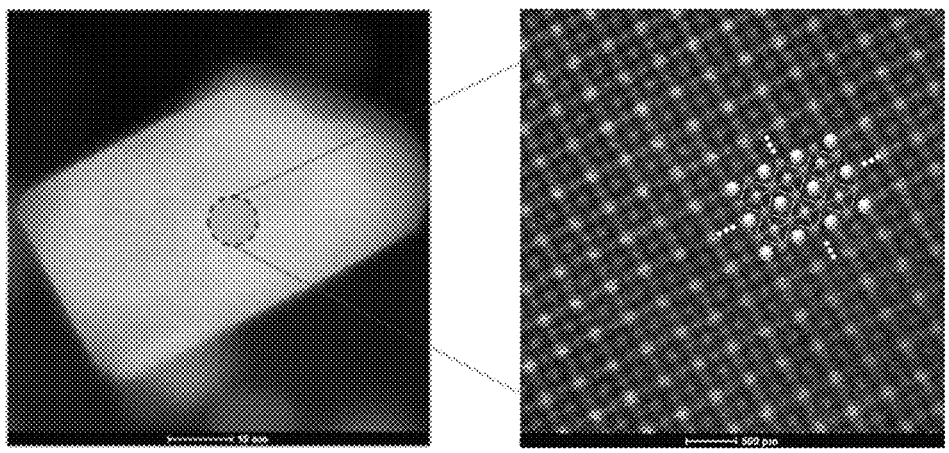
FIG. 3 shows high magnification transmission electron microscopy images of a perovskite compound produced in Example 1 and a catalyst produced in Example 2 and a schematic diagram of a perovskite lattice structure predicted based on the images.
Figure 3:
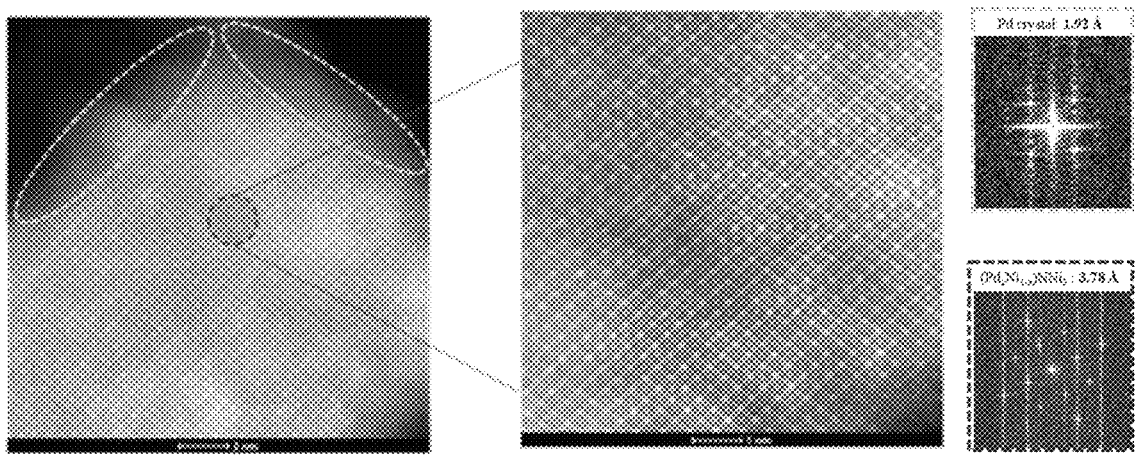
Figure 3:
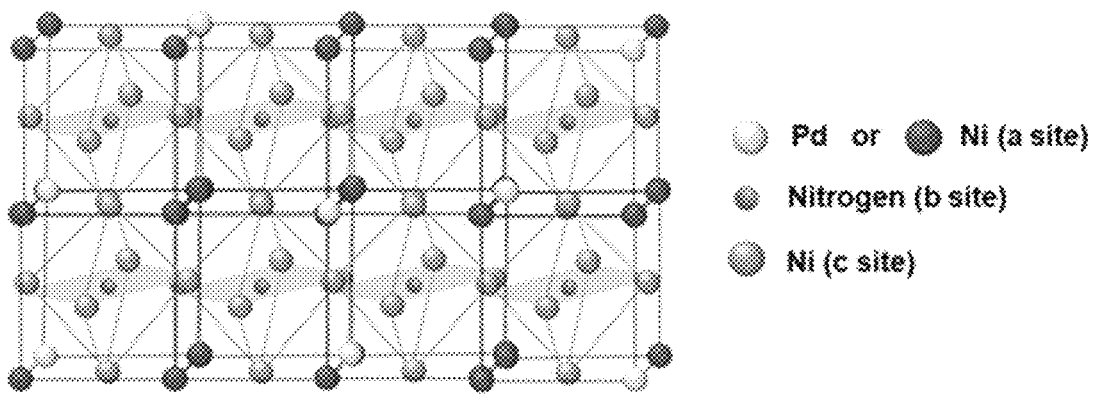

High magnification transmission electron microscopy revealed that the PdNiN alloys constituting the cores of the perovskite compound and the catalyst had perovskite lattice structures. FIG. 3 shows high magnification transmission electron microscopy images of the perovskite compound and the catalyst and a schematic diagram of the perovskite lattice structure predicted based on the images.

Diffraction pattern analysis of the perovskite compound revealed the presence of the perovskite lattice structure. Diffraction pattern analysis of the catalyst revealed the presence of the palladium shell coated on the core surface (orange dashed lines) and the perovskite lattice structure at the center (gray dashed lines).

The elements in the A, B, and X positions of the perovskite lattice were in perfect agreement with the results from the TEM images.

Test Example 4: Durability Analysis

The perovskite compound produced in Example 1 and the catalyst produced in Example 2 were tested for mass activity and durability.

Each of the perovskite compound and the catalyst in the form of powders was dispersed in alcohol to prepare a catalyst ink. The catalyst ink was dropped onto a rotating disk electrode and evaporated to dryness to remove the alcohol, leaving only the catalyst powder on the disk electrode. The electrochemical properties of the perovskite compound and the catalyst were analyzed using a 3-electrode system. An SCE electrode and a platinum wire were used as the reference and counter electrodes, respectively. The entire analytical procedure was carried out at room temperature. The area of the rotating disk electrode was 19.6 mm². The durability of the perovskite compound and the catalyst was tested using the 3-electrode system in an oxygen-saturated 0.1 M perchloric acid solution. After the initial performance was measured (20 cycles), cyclic voltammetry (CV) was performed for 3000 cycles at a scan rate of 100 mV/sec in the voltage range of 0.6-1.0 V (vs. RHE).

Figure 4:
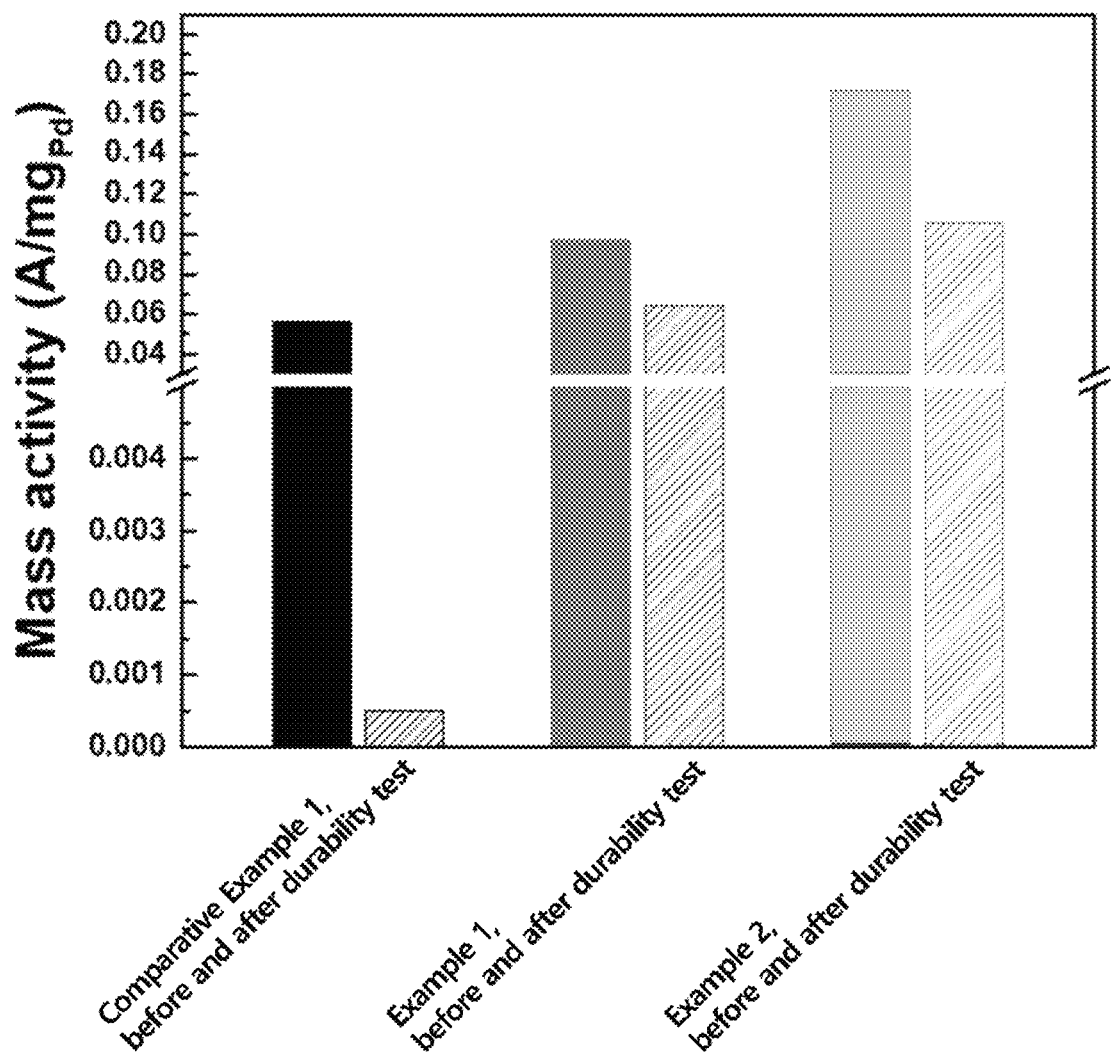
FIG. 4 shows changes in the mass activity of a perovskite compound produced in Example 1, a catalyst produced in Example 2, and a commercial catalyst used in Comparative Example 1.

FIG. 4 shows changes in the mass activity of the perovskite compound of Example 1, the catalyst of Example 2, and the commercial catalyst of Comparative Example 1. As shown in FIG. 4, the perovskite compound of Example 1 and the catalyst of Example 2 had high mass activities compared to the commercial catalyst. After the durability test, the commercial catalyst showed significantly reduced activity, but the perovskite compound of Example 1 and the catalyst of Example 2 underwent less reduction in activity, demonstrating their better durability than that of the commercial catalyst.

In conclusion, the perovskite structures of the perovskite compound and the palladium-based catalyst according to the present invention can provide a solution to the problem of low stability of palladium. As a result, the perovskite compound and the palladium-based catalyst of the present invention can be used as catalysts for fuel cells due to their high durability and activity. In addition, the palladium-based catalyst of the present invention can replace existing platinum-based catalysts for fuel cells, contributing to an improvement in the price competitiveness of fuel cells.

Although the present invention has been described herein with reference to the foregoing embodiments, these embodiments do not serve to limit the scope of the present invention. Those skilled in the art will appreciate that various modifications are possible, without departing from the spirit of the present invention. Accordingly, the scope of the present invention should be defined by the appended claims.

What is claimed is:

1. A perovskite compound represented by Formula 1:

$$[A_nPd_{(1-n)}][B][X]_3 \qquad (1)$$

wherein A is a metal other than palladium, B is selected from nitrogen, phosphorus, sulfuric acid, boron, carbon, and oxygen, X is identical to or different from A and is a metal other than palladium, and n is a real number satisfying 0≤n<1, and wherein n in Formula 1 is a real number satisfying 0.1≤n<0.5.

2. The perovskite compound according to claim 1, wherein each of A and X in Formula 1 is independently selected from nickel, cobalt, copper, iron, vanadium, chromium, manganese, and zinc.